Patented June 7, 1932

1,862,508

UNITED STATES PATENT OFFICE

WILLIS G. HOWARD, OF CHICAGO, ILLINOIS, ASSIGNOR TO THE STEROLENE COMPANY, OF CHICAGO, ILLINOIS, A CORPORATION OF ILLINOIS

TREATING EGGS

No Drawing.   Application filed January 31, 1927. Serial No. 165,038.

These improvements relate to methods of treating the eggs of domesticated fowls used for food purposes, known simply as eggs, with a preservative for maintaining them fresh and wholesome under ordinary conditions, which means inhibiting the action in them of certain aerobic putrefactive bacilli causing them to spoil.

For some years there has been a commercial practice of dipping the eggs for a brief space of time, say from three to four seconds, in mineral oil or a mineral oil compound raised to a temperature considerably above the boiling point of water, in order to coagulate the inner skin of the egg immediately under the shell and render it much less pervious to air, and to kill or inhibit the growth of putrefactive organisms therein, and also to vaporize the moisture in the shell and allow oil to penetrate the pores thereof, producing a substantially air-tight covering for the egg contents, and also killing or inhibiting the spread of noxious bacilli from the shell to the interior; and, importantly, to accomplish this without coagulating to a substantial extent, if at all, the white of the egg.

The dipping process has been carried on commercially in machines having a tank containing the heated oily bath and provided with devices for carrying successively into and out of the bath trays respectively containing a considerable number of eggs. An illustration and explanation of such a machine will be found in the patent to Carl G. Olsen 1,564,615 of December 8, 1925 on egg treating devices.

Notwithstanding that the process of dipping eggs in a hot bath by various kinds of machines has been carried on for some years the results have not been entirely satisfactory with respect to the uniformity of the treatment, some eggs being over-treated and others under-treated when put through the same machine and subjected to the same temperature and the same interval of treating time.

The patent to Clairemont, Number 1,692,897 of April 14, 1914 and that to Kasser, Number 1,264,657 of April 30, 1918, suggest dipping the eggs in a preheating bath of about one hundred degrees Fahrenheit and then immediately proceeding with the treating operation. One object of the present invention is to provide a highly practicable, rapid simple and cheap method for gaining the desired results of uniformity in treatment when the eggs are of the widely-varying temperatures found in practice.

In my study and investigation of this objection I have discovered that the temperature of the egg being treated has an important relation to the temperature of the bath in attaining the desired results. That is to say, I have found that an egg having a temperature of say 70° F. will be overtreated while one having a temperature of say 30° F. will be undertreated when subjected to the given temperature and time element heretofore deemed appropriate for all eggs being passed through the machine.

The irregular and unsatisfactory results mentioned arise, as I have found, from the fact that various batches or quantities of eggs are received at the treating machine at widely varying temperatures of the eggs, and are put through the machine at a bath temperature and time element heretofore deemed appropriate under all conditions.

As to various and varying temperatures of the eggs it is clear that eggs exposed to summer heat will have a much higher temperature than eggs exposed to winter cold. Furthermore, large quantities of eggs so treated are received in the summer time from cold-storage plants and heretofore have been put through the machine under the same bath conditions as those exposed to the summer heat. Again, in winter it often happens that eggs to be treated are received from cold rooms or from outside temperatures while others currently being treated have remained in a fairly warm room for such a considerable length of time as to have attained the temperature of the room.

The object of the present invention is to provide a method according to which the automatic treatment of eggs according to the mechanical method hereinabove mentioned may be readily and easily performed, without loss of efficiency of the machine, and to the result of substantial uniformity of treatment and proper treatment of all of the eggs passing through the machine.

All such treating machines are provided with means for heating the oil in the bath, such as gas burners or electric heating devices, with means for regulating the heat of the bath.

In practicing this invention, according to the preferred mode, the temperature of the eggs to be treated is first ascertained, and then the temperature of the bath is varied, if not then at the proper temperature, to an appropriate extent. It has been customary in the past to provide a temperature in the bath ranging upward from say 220° Fahrenheit to say 235° F. or even 240° F., the operator usually considering a range of 20° or thereabouts permissible. I have found that such currently employed temperatures in the bath are suitable for eggs of the higher temperatures only.

The following table shows what I have found to be suitable temperatures for the bath when the eggs are at certain temperatures commonly found in practice and the immersion is for the preferred small interval of three seconds:

| Eggs | Bath |
|---|---|
| 70° F | 220° F. to 230° F. |
| 60° F | 230° F. to 240° F. |
| 50° F | 240° F. to 250° F. |
| 40° F | 250° F. to 260° F. |
| 30° F | 260° F. to 270° F. |

The importance of such variations in the temperatures of the bath will be appreciated when it is considered that a cold egg shell requires a greater amount of heat in a given brief interval of time to raise it to say 212° Fahrenheit than is required by a warm shell. According to the preferred method the time element remains substantially a constant.

According to the temperatures of the bath given in the table for the respective temperatures of the eggs substantially the same amount of coagulation and impregnation by the oil takes place, the time element remaining constant at about three seconds.

An easy way for the operator to determine the proper temperature of the bath from time to time is first to take the temperature of the eggs, add to it such a figure as will total 300, and consider that added figure as representing the maximum temperature of the bath. Such figures are shown by the table. The table indicates that a variation of temperature in the bath of 10° F. within the preferred maximum suggested is permissible. The table thus shows that the operator is not required to burden himself with maintaining a really critical degree of heat. This makes for sufficient flexibility for ordinary practice. For most accurate results, however, the method of adding temperatures to produce the sum of 300 should be used. Thus, if the temperature of the eggs were 65° F. the temperature of the bath should preferably be 235° F.

In practice a card posted adjacent to the machine and showing a tabulation of the appropriate temperatures of the bath for the respective egg temperatures would relieve the operator even of the trouble of making the computation.

It is clear then that according to this preferred method the temperature of the bath is varied in accordance with the temperature of the eggs at any given time being treated, and to such effect that in a given brief and substantially constant interval of time substantially uniform treating results are had although different batches or quantities of the eggs from time to time being treated are of widely different temperatures.

The other alternative would be to vary the time element while maintaining the bath temperature substantially constant since the only two factors involved are temperature and time. In carrying out the method by varying the time factor the rate of operation of the machine could be varied, speeding it up for warm eggs and causing it to operate more slowly for cold eggs. This method is not preferred for various reasons, but some beneficial results could be had thereby.

In this connection I will mention that the temperature of the oil must be sufficiently great to drive off moisture and coagulate the inner skin, and the temperature of the oil should be substantially high so as to effect the result in a brief interval of time in order to process the eggs rapidly both from the economic standpoint and from the standpoint of preventing coagulation of the white of the egg. If the immersion is for more than a very brief space of time at any temperature that will do the work there will be such penetration of heat as to cause some coagulation of the albumen before the desired effects are had upon the shell and skin portions. Usually a considerable part of the white of the egg becomes cloudy, with very definite coagulation nearer the skin. It is therefore clear that any variation in the time element must be within what is probably not more than a second, and that each of the numerous variations which would be required would be only a small fraction of a second. It thus appears that to obtain the desired results through variations in the time element would call for operations fairly critical.

On the other hand, where only the temperature factor is involved the variations are not nearly so critical, since, as the table shows, in treating eggs ranging from 70° F. to 30° F. in temperature there is a temperature variation of 40° F., with the further anti-critical element of a considerable permissible variation from any of the bath temperatures shown by the table for any given temperature of the eggs. The temperature regulation method is therefore much more easily to be practiced by the ordinary workman and by processing machines now in use.

I claim:

1. That part of the process of treating eggs of different temperatures by immersion and in which process heat and a small interval of time are the factors of the treatment, which comprises varying one of said factors in accordance with variations in the temperature of the eggs, the other of said factors remaining substantially constant.

2. That part of the process of treating eggs of different temperatures by immersion in a heated liquid for a short interval of time, which comprises varying the heat of the liquid in accordance with variations in temperature of the eggs, the time element of the immersion remaining substantially constant for all variations of the liquid temperature.

3. That part of the process of treating eggs of different temperatures by immersion in a heated oil at a temperature between 212° F. and 300° F. for a short interval of time, which comprises varying the heat of the oil in accordance with variations in temperature of the eggs, the time element of the immersion remaining substantially constant for all variations of the oil temperature.

4. That part of the process of treating eggs of different temperatures by immersion in a heated oil at a temperature between 212° F. and 300° F. for a short interval of time, which comprises varying the heat of the oil inversely as the temperature of the eggs varies while maintaining the brief period of immersion substantially a constant.

5. That part of the process of treating eggs of different temperatures by immersion for a small interval of time substantially constant for all egg temperatures in an oil bath having a temperature of at least 212° Fahrenheit for the warmest eggs treated, which comprises increasing the temperature of the bath as the temperature of the eggs decreases and decreasing the temperature of the bath as the temperature of the eggs increases.

6. That part of the process of treating eggs of different temperatures by immersion, for a small interval of time substantially constant for all egg temperatures, in an oil bath and with the bath temperatures varying with the egg temperatures substantially in accordance with the following table, to wit:

| Egg temperatures | Bath temperatures |
|---|---|
| 70° F. | from 220° to 230° F. |
| 60° F. | from 230° to 240° F. |
| 50° F. | from 240° to 250° F. |
| 40° F. | from 250° to 260° F. |
| 30° F. | from 260° to 270° F. |

7. That part of the process of treating eggs of different temperatures by immersion in an oil bath for a short interval of time which is substantially constant for all egg temperatures, which comprises varying the bath temperature from time to time whereby the bath temperature plus the temperature of the eggs being treated is between 290° and 310° Fahrenheit.

8. That part of the process of treating eggs of different temperatures by immersion in an oil bath for a short interval of time which is substantially constant for all egg temperatures, which comprises varying the bath temperature from time to time whereby the bath temperature plus the temperature of the eggs being treated is approximately 300° Fahrenheit.

9. That part of the process of treating eggs of different temperatures by immersion and in which process the heat of the bath and a small interval of time for the immersion therein are the factors of the treatment, which comprises varying the interval of time of the immersion in accordance with variations in the temperature of the eggs, the temperature of the bath remaining substantially constant.

WILLIS G. HOWARD.